Jan. 7, 1958 C. VEACH 2,818,742
QUICK CHANGE SHAFT
Filed Nov. 10, 1955
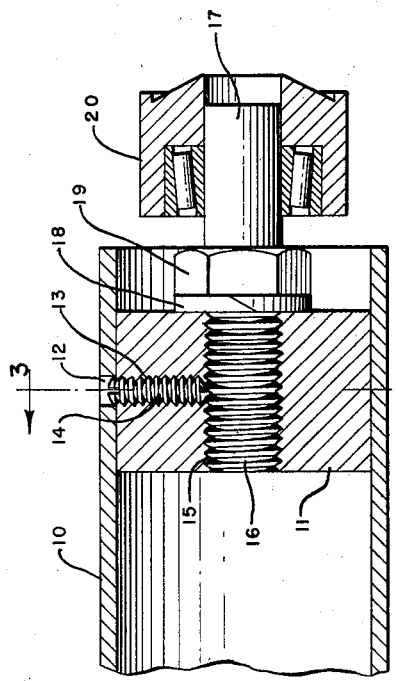
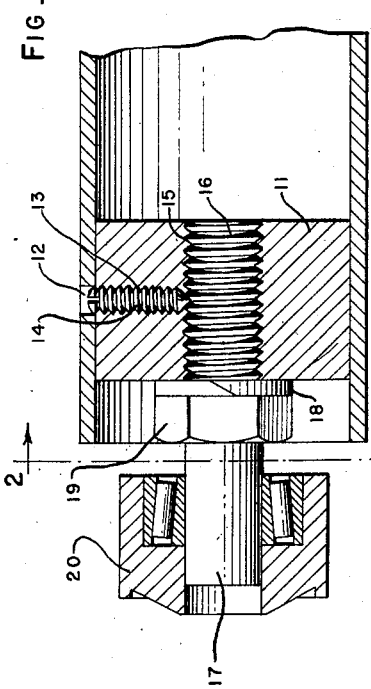
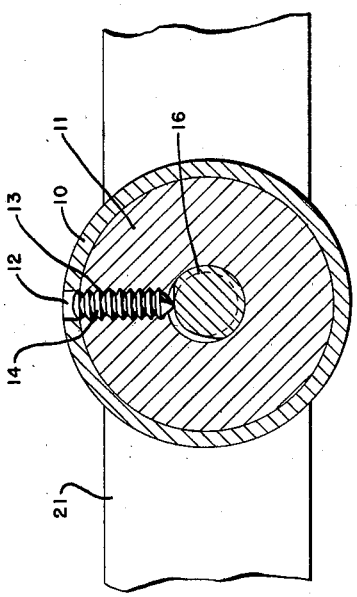
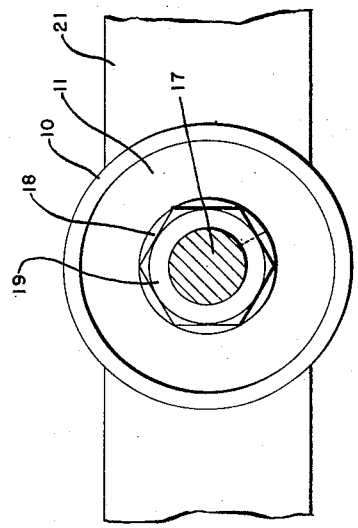
INVENTOR.
CLYDE VEACH
BY
Patrick D Beavers
ATTORNEY

United States Patent Office 2,818,742
Patented Jan. 7, 1958

2,818,742

QUICK CHANGE SHAFT

Clyde Veach, Grays Knob, Ky.

Application November 10, 1955, Serial No. 546,080

1 Claim. (Cl. 74—230.3)

This invention relates to a quick change shaft for use on a steel roller of a conveyor belt.

At the present time when a roller shaft wears out, it is necessary to purchase an entire new roller with the shaft pressed into the ends.

An object of the invention, therefore, is to provide a quick change shaft for a tube or roller whereby it is only necessary to remove the shafts and replace them in order to continue to use the tube or roller.

Another object of this invention is to provide a quick change shaft that will save considerable expense in replacement parts.

With the above and other objects and advantages in view, the invention consists of the novel details of construction, arrangement and combination of parts more fully hereinafter described, claimed and illustrated in the accompanying drawing in which:

Fig. 1 is a longitudinal sectional view of a tube or roller equipped with quick change shafts embodying the invention;

Fig. 2 is a vertical sectional view on the line 2—2 of Fig. 1; and

Fig. 3 is a vertical sectional view on the line 3—3 of Fig. 1.

Referring more in detail to the drawing, wherein like parts are designated by like reference numerals, a tube or roller that is used in a belt conveyor system is generally designated by the reference numeral 10.

In carrying out the invention a cylindrical block 11 is press fitted into each end of the tube or roller 10. An opening 12 is positioned in the tube or roller 10 in alinement with a threaded bore 13 in each cylindrical block 11 and a set screw 14 is threaded into the opening 12 and bore 13 in each of the cylindrical blocks 11.

Each of the cylindrical blocks 11 is provided with an axial threaded bore 15 to receive a threaded end 16 of a shaft 17. The set screws 14 extend at right angles to the threaded end 16 of the shaft 17 so that when the end of the Allen screw 14 engages the threaded end 16 of the shaft 17, the shaft 17 will be retained in its respective cylindrical block 11.

A lock washer 18 and a hex nut 19 on each shaft abuts the side of each cylindrical block 11 and further assists in retaining each shaft 17 in its respective cylindrical block 11.

Each of the shafts 17 is mounted in a roller bearing 20 that is mounted in the frame 21 of the conveyor.

It will be apparent, therefore, that as the shafts 17 wear, the same can be easily replaced by withdrawing the Allen screw 14 engaging the particular shaft that is worn and unscrewing the worn shaft from the cylindrical block in which it is mounted so that a new shaft can replace the worn shaft.

There has thus been provided a quick change shaft that is capable of easy replacement when worn and in the replacement thereof will save considerable expense.

It is believed that the structure and operation of the invention will be apparent to those skilled in the art and it is to be understood that changes may be made in the minor details of construction, arrangement and combination of parts without departing from the spirit of the invention and the scope of the appended claim.

Having thus described the invention what is claimed as new and desired to be secured by Letters Patent is:

The combination of a tubular roller, a cylindrical block having an axial threaded bore mounted in each end portion of said roller, said roller having an opening in the wall thereof adjacent each block, a shaft having a threaded portion thereon threaded into each of the cylindrical blocks, a set screw threaded into each cylindrical block through said openings and at right angles to each shaft and each engaging the threaded portion of a shaft, and a washer and nut on each shaft abutting each cylindrical block to space a bearing on the shaft from said cylindrical blocks.

References Cited in the file of this patent

UNITED STATES PATENTS

| | | |
|---|---|---|
| 461,686 | Moulton | Oct. 20, 1891 |
| 527,708 | McCorkindale | Oct. 16, 1894 |
| 804,030 | Ostrander | Nov. 7, 1905 |
| 902,736 | Jennings | Nov. 3, 1908 |
| 2,563,117 | Hurley | Aug. 7, 1951 |